United States Patent [19]
Wünning

[11] 4,208,367
[45] Jun. 17, 1980

[54] PROCESS AND APPARATUS FOR MAKING ROD-SHAPED BODIES FROM SINTERABLE GRANULAR MATERIAL

[76] Inventor: Joachim Wünning, Bergstrasse 20, 7251 Warmbronn, Fed. Rep. of Germany

[21] Appl. No.: 715,120

[22] Filed: Aug. 17, 1976

[30] Foreign Application Priority Data

Aug. 22, 1975 [DE] Fed. Rep. of Germany ....... 2537508

[51] Int. Cl.² ...................... C04B 33/32; C04B 21/00; C04B 35/64
[52] U.S. Cl. .......................................... 264/43; 75/5; 264/64; 264/65; 264/125; 264/62; 264/45.9; 264/48; 264/165; 264/148; 264/DIG. 63; 264/DIG. 65; 425/79; 425/461
[58] Field of Search ................ 264/121, 125, 332, 43, 264/44, 64, 65, 165, 148, DIG. 63, DIG. 65, 45.9, 48, 62; 75/5, 20 F, 222; 425/79, 461

[56] References Cited

U.S. PATENT DOCUMENTS

| | | | |
|---|---|---|---|
| 1,818,101 | 8/1931 | Slidell | 264/43 |
| 2,143,905 | 1/1939 | Ahlmann | 75/5 X |
| 2,191,658 | 2/1940 | Haux | 75/20 F |
| 2,341,059 | 2/1944 | Parsons | 264/43 X |
| 2,362,701 | 11/1944 | Koehring | 425/79 |
| 2,792,302 | 5/1957 | Mott | 75/222 X |
| 3,083,091 | 3/1963 | Schenck et al. | 75/5 |
| 3,293,692 | 12/1966 | Rosenbaum | 425/79 |
| 3,328,187 | 6/1967 | Ban | 264/43 |
| 3,413,112 | 11/1968 | Dillon | 75/5 |
| 3,540,884 | 11/1970 | Horbury | 75/222 X |
| 3,619,435 | 11/1971 | Kepper | 264/43 |
| 3,850,715 | 11/1974 | Jebens et al. | 264/43 X |
| 3,941,359 | 3/1976 | Shinville et al. | 266/177 |
| 3,980,466 | 9/1976 | Drugge | 75/5 |
| 4,017,290 | 4/1977 | Budrick et al. | 264/43 X |

Primary Examiner—Richard E. Schafer
Attorney, Agent, or Firm—Flynn & Frishauf

[57] ABSTRACT

Granular material, gaseous fuel and air are preheated to just below the sintering temperature of the granular material. The hot granular material is passed through a mold in which a reticular device for distributing the fuel is provided to define a conical or vaulted surface with its vertex upstream, extending across the cross-section of the mold and defining the upstream end of a combustion zone into which the granular material passes after entering the mold. Air is supplied through a perforated wall and pushes the granular material as well as advancing with it to the combustion zone. Combustion of the fuel in the combustion zone thus defined brings the granular material to the sintering temperature and a fused rod of cellular structure (i.e. with small enclosed voids, generally not communicating with each other) is continuously formed that is pulled out by rolls in a pre-cooling section of the apparatus immediately downstream of the mold. The granular material must be sinterable and is preferably ceramic, such as bloating clay or waste glass.

29 Claims, 9 Drawing Figures

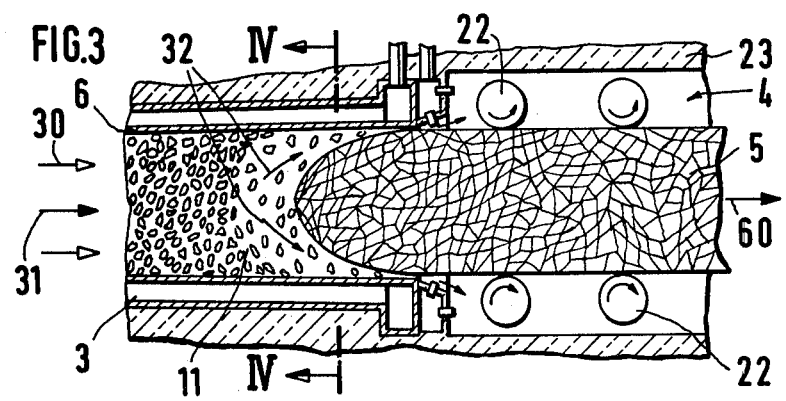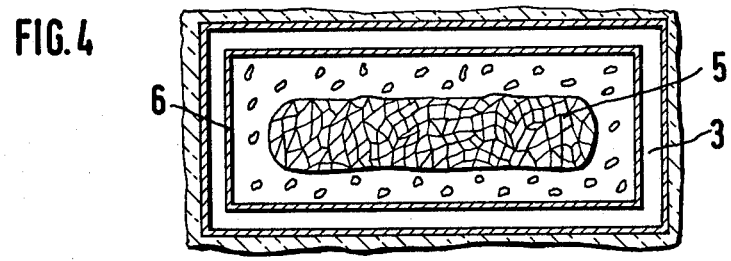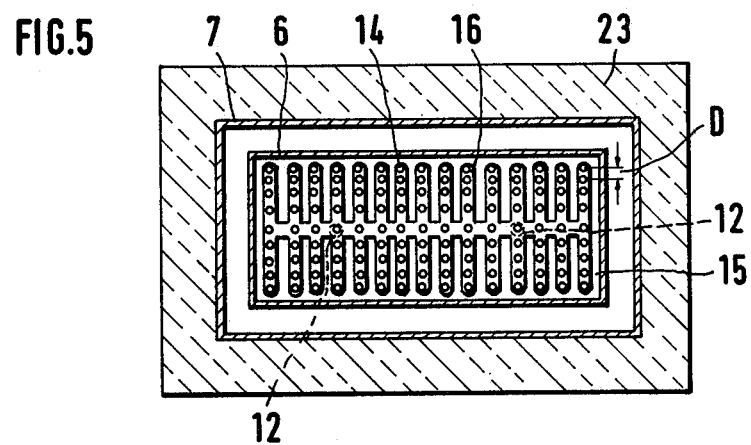

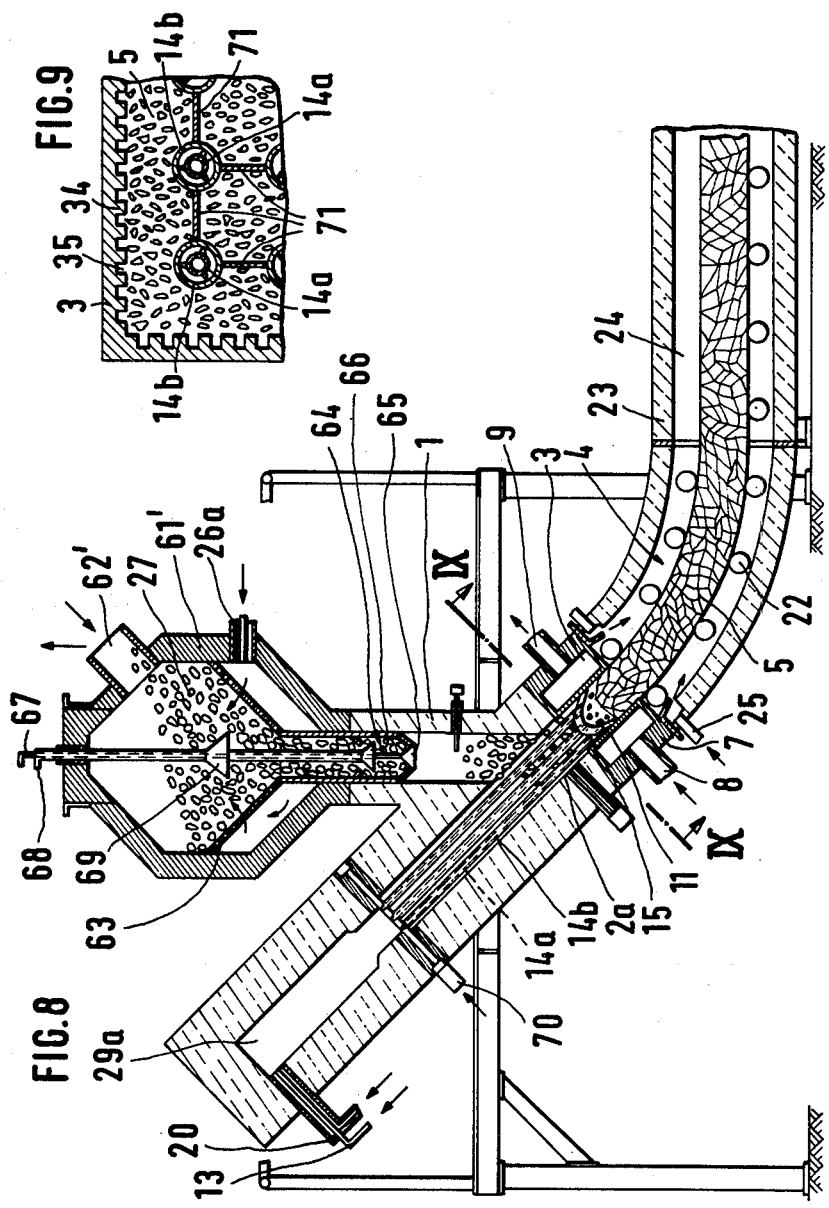

PROCESS AND APPARATUS FOR MAKING ROD-SHAPED BODIES FROM SINTERABLE GRANULAR MATERIAL

This invention relates to a process and apparatus for manufacturing rod-shaped bodies of cellular structure from sinterable ceramic granular material by passing the granulated particles through an apparatus in which they are evenly brought up to sintering temperature and continuously form a molded rod as they are sintered together. By "cellular" is meant that the sintered product encloses many small voids, but not that these voids necessarily communicate with each other to form a porous structure. The apparatus is of the kind that includes heating means for heating the moving mass of granular material and a transport means for pulling the rod-shaped body formed, and may include preheating means for the granular material and for the fuel and the combustion-supporting air.

Building materials generally require a high crush resistance for supporting the pressure of a load and a low heat conductivity to reduce the cost of heating and cooling enclosed space. For a given crush resistance, the heat conductivity can be minimized by providing the solid units of building material with a regularly fine-celled structure. Larger cavities and pores (larger than 2 mm) result in increased heat conductivity by convection within the pores. "Open" porosity results in absorption of moisture, which also increases the heat conductivity. A ceramic body of "closed" cellular structure with small voids that generally do not communicate with each other, on the other hand, has low-heat conductivity.

A method of making rigid molded bodies of closed cellular structure, particularly for building material units, from ceramic particles is disclosed in German Pat. No. 1 471 408. In that process the particles, which are of substantially equal size, are allowed to fall freely through a stream of heating gas in a heating shaft, which causes the particles to be bloated into hollow bodies and also to make the surfaces of the particles sticky by surface melting. The hollow particles thus formed are then gathered on moving surfaces provided at the lower end of the heating shaft and are there melted together while preserving their hollow structure, in such a way that they form non-porous bodies of cellular structure that are impermeable to water.

Since the particles are bloated and are made superficially sticky as the result of free fall through the heating shaft, it is not possible in the process just described to prevent the particles from forming clumps when they move against each other in the lower part of the heating shaft. Furthermore, it is only with difficulty that the hot particles can be prevented from sticking to the gathering surface, that usually is constituted as a conveyor band, quite apart from the problem that a scraping device must be provided at the exit from the heating shaft that is capable of high thermal loading and is exposed to a correspondingly high wear. Clumping of the material naturally also occurs in the region where the particles are scraped off the conveyor that carries them out of the heating shaft. All clump formations result in irregularities in the constitution of the molded body subsequently made from the heated particles.

A more evenly constituted molded body can be made by a process described in Austrian Pat. No. 287,562. In that case a granular material capable of being bloated by heat and of more or less regular particle size is first made into a loosely compacted body in the shape and dimensions of the molded body to be produced, the compact being supported unyieldingly on all sides. Then this loosely compacted body has highly heated gas blown through it alternately and intermittently from opposite sides until a plastic and adhesive surface condition of all granules is obtained. This process, however, requires box-type forms with walls that permit the passage of gas through them, these forms each having to be filled with granular material for the process. Because of the necessity of using individual box-type forms, the process can operate only on a batch basis or intermittently. Furthermore, the individual forms must at least partly go through the temperature cycle of the treated material, which involves high energy costs and short useful lives for the molds or forms. Finally, for practical reasons, the dimensions of the molded bodies producible by this process are limited. It is also to be noted that the feed region of the raw material where the hot gas enters it is first warmed and expanded and this can interfere with the further penetration of the material by the gas, so that the edge regions of the product have a different constitution from the core regions if the product dimensions exceed certain limits.

It is an object of the present invention to provide a continuous process and an apparatus therefor that involves low machinery expense and operates with little wear or deterioration of the apparatus and with low heat losses capable of producing rod-shaped bodies of cellular structure from sinterable granular ceramic materials, and in particular to provide a process and apparatus therefor by which molded bodies distinguished by high dimensional accuracy and uniform quality may be produced.

SUMMARY OF THE INVENTION

Briefly, particles of a sinterable granulated material are caused to flow evenly through an extrusion mold mounted in a fixed position which defines the circumferential shape of a rod-shaped body thereby produced, and the particles are heated evenly in a combustion zone in a defined position within the advancing mass of particles in the mold to the sintering temperature, while at the same time the sintered rod thus formed is continuously pulled out of the extrusion mold as new material is sintered onto the rod body in the combustion zone.

The new process makes it possible to heat the particles of the moving mass of granular material quickly, for example within one or a few minutes, so that the shaping walls of the extrusion mold are exposed to only moderate temperature loading on their inner surfaces.

In a preferred form of the process, the particles of the mass of granular ceramic material move together while relatively at rest with respect to each other while passing through the combustion zone, thus moving as a piston through the mold. Thus, even with particles having a tendency to clump, uncontrolled clump formation is largely avoided, because the particles do not move past each other during the sintering operation.

It is particularly desirable to heat the granular material in the combustion zone by means of heating gases that are carried along with the moving particles. To the extent necessary a component of heating gas flow from the inside toward the outside of the mass of particles can thus be provided. Such a flow of heating gas from the inside to the outside of the mass of particles makes it possible for the heating gases to flow through the granular material before they reach the walls of the extrusion mold, so that the mold can thereby be protected from exposure to excessive thermal stresses.

In the case of a considerable group of materials, the granular material becomes impermeable to gas after being subjected to combustion as the result of formation of a "closed" cellular structure. A premature combustion in the edge zones would make it impossible thereafter to pass the heating gas into the core of the particle mass and thus, likewise, prevent the core from being quickly brought up to the combustion temperature. In order to provide even exposure to combustion throughout the cross-section of the moving mass of particles, the heating gases can be supplied to the region of the core of the moving mass in such a way as to form a combustion zone having an upstream face relative to the flow of particles which has the shape of a cone, even a rounded cone such as a parabaloid, with its vertex upstream with respect to the movement of the particles. On the sides of the combustion zone, the spent gas flows from the interior outwards and proceeds out of the mold along with the rod-shaped body that is produced. The increased gas velocity thus occurring in the edge zones at the downstream end of the mold provides the effect that the rod-shaped body is subjected to firing right out to its edge, and this will also occur when the temperature of the inner walls of the mold is regulated so as to be appreciably less, in order to prevent sticking of the particles to the wall.

The heating gases can, moreover, be at least in part provided by burning in the granular material feed entering the combustion zone. Thus, for example, combustible additives, such as crude coke may be mixed in to the mass of advancing particles of granular ceramic material.

In principle, it is also possible to provide, for special cases, heating of the granular material by electrical means, for example by means of microwaves.

It is also possible to premix gaseous fuel and combustion supporting air in the mass of granular ceramic particles before entrance into the mold and then to ignite the mixture within the mold in such a way that the desired combustion zone shape is produced. Because of the danger of backfiring, in such a case the granular materials can be preheated only to a limited extent. As a rule, it is therefore preferable to supply fuel and combustion supporting air separately and to mix them just ahead of the combustion zone in such a manner that the mixture is distributed evenly and then to ignite the mixture. For this purpose either the fuel gas or the air can be brought to the combustion zone along with the particles of granular material and the other gas can be released in individual jets evenly distributed over the mold cross-section at a surface of desired configuration. When fuel and air are brought separately right up to the reaction boundary in the combustion zone, the granular material and one of the gases, for example, the air, can be preheated to just below the sintering temperature of the granular material without producing any interference in the movement of the granular material by sticking of the particles to each other, to the mold walls, or to the nozzle tubes guiding the individual jets of the other gas. In such cases it has been found desirable for the spacing between the individual jets to be less than three times the average diameter of the particles of the granular material.

In order to provide increased economy, the combustion supporting air can be preheated before being brought near the granular particles, with waste heat from the process utilized for this purpose. The moving mass of particles can also be preheated ahead of its entry into the mold by not heating gases supplied in countercurrent to the flow of particles, in this case also waste heat from the process being utilized. It is also possible to provide partial combustion of solid, liquid or gaseous fuels previous to their introduction into the mold to gasify, by vaporization of dissociation, the fuel and to preheat it. The combustion atmosphere in the combustion zone can be adjusted by regulating the gas to air ratio.

The flow of granular material through the mold can be pneumatically fed, in which case the combustion supporting air being supplied in the same direction can operate as the transport medium or a similarly supplied combustion gas can be used in the same manner. It is also possible to advance the mass of granules mechanically, stepwise for example, as may be done with the use of a piston or punch. Since in the case of certain granular materials the solid body produced is impermeable to gas, it is possible in such cases to provide the advancing movement of the solid body by producing gas pressure in the mold tending to push out the solid body.

Since the heating of the flowing mass of granules in the combustion zone takes place from the inside outwards, the mold does not have to be brought to the high sintering temperature of the material (in the case of ceramic raw materials that is in the region of 1000° to 1200° C.). In order to prolong the life of the mold, the walls of the mold can be cooled by a cooling medium. It is possible in such cases to prevent the baking-on of particles of the granular material, if necessary, by cooling the inner walls of the mold to a temperature below the maximum temperature at which a sticking of the sintered body to the mold can be avoided.

The rod-shaped body is relatively soft as it comes out of the mold; it can therefore be trimmed to exact dimensions by a die or it can similarly be subdivided at this stage. The capability of further shaping disappears with falling temperature. A fire clay rod can, for example, be cooled relatively fast to about 700° C. For prevention of cooling cracks, however, it must be cooled slowly below that temperature under control of the time rate of fall of temperature. The cooling can be carried out in a thermally insulated cooling tube provided as a downstream extension of the mold, into which the spent gas from the mold enters, with an admixture in predetermined or regulated proportions of a cooling gas, for example air.

The new process is in general useable for all sinterable materials, from synthetic materials up to high melting metals. In the case of manufacture of building material units for the construction industry or of blocks of insulating materials for lining ovens or for other uses in the metallurgical industry, etc., materials can be used which are bloated by evolution of gas in the temperature range of sintering and softening, so that interstitial spaces between the particles of the granular material are filled and a cellular structure of uniform properties is produced that has essentially closed pores. Such particular expandable mineral raw materials are bloating clay, clay slate (schist, argillite, etc.), slags, glass waste, etc. When granular materials capable of being bloated are utilized, the particles can be simultaneously bloated and sintered on to the rod being produced in the combustion zone. On the other hand, the process can be operated so that the bloating and the sintering take place sequentially, with the material advancing directly from the place of bloating to the place of sintering without any substantial cooling in between.

In the case of insufficient bloating capability of the material, the specific gravity of the solid rod can be reduced by utilizing hollow grained granules of prefoamed material or by, more generally, utilizing granules materials of low packing density. The particle shape of the granular material can be spherical (pellets), cylindrical (rod-shaped compacts), or anything else (pressed compacts, crushed solids, etc.). If the grain size is too small, the passing of gas therethrough can under some conditions be difficult, whereas if the grain size is too large, the heating through of the grains to their interiors has too great a duration and/or the surface portions of the particles are subject to overheating. A particle diameter range up to 30 mm has been found suitable for the practice of the present invention and it is preferred to operate with particles of an average diameter from 3 to 20 mm.

The granular raw material can if necessary be pre-dried in order to prevent the development of cracks by vaporization of water during quick heating. Waste processing heat can be used for this purpose, for example heat originating from the final cooling of the solid rod. As previously mentioned, a preheating of the granular material up to a temperature closely below the sintering temperature is desirable, since up to that point granular flow without sticking is maintained, so that countercurrent heating at high efficiency is possible, for which waste heat of the process can also find application.

The surface of the rigid molded body can be post-fired after coming out of the mold. It is also possible to coat the surface of the rigid rod-shaped body after it comes out of the mold, for example with a glaze or the like.

In order to provide a trouble-free process control and, thereby, a uniform quality of the extruded rod, it is desirable to monitor the temperature in the combustion zone. This can be done, for example, by a suitably protected thermal sensor. It is somewhat simpler to measure the temperature periodically rather than continuously, because in that way it is easier to prevent sticking of the granular material to the sensor.

It is a characteristic feature of the apparatus for the practice of the process of the present invention that a fixed extrusion mold is provided that defines the circumferential shape of the rod produced, the mold being open at both ends. At the downstream end of the extrusion mold, pulling means are provided for operation coaxial with the axis of the extrusion mold for pulling the solid rod out of the mold. Heating means are provided in the mold in such a way as to define a combustion zone of an appropriate configuration extending fully across the open cross-section of the mold interior.

Tubular conduits can separately supply the fuel gas and air to the heating means, releasing these in the combustion zone or immediately upstream of it. Jet nozzles are preferably connected to these supply tube distribution networks, the nozzles being distributed over the cross-section of the mold. The jet cross-section shape can be appropriately chosen to suit the desired combustion zone configuration.

Practical experience with the invention has shown that it is advantageous for the spacing between the jet nozzles to be less than three times the average particle diameter of the granular material. Furthermore the spray nozzles should preferably give their jets a motion component in the direction of movement of the rod-shaped body that is produced, so that the flow of fuel gas or combustion supporting air can flow along with the mass of granular material to be sintered. The jet nozzles, moreover, preferably release their gas jets over a common jet nozzle surface that is substantially in the shape of the reaction boundary of the combustion zone. This reaction boundary can for the reasons already stated be of conical or paraboloid shape, or some similar or intermediate tapered shape.

Deviations in the movement of the mass of granular material can result in the particles intended to pass between the jet nozzles forming bridges, in the case of sufficient particle dimensions, which bridges can then interfere with the advance of the granular mass. In order to prevent this, the apparatus can be provided with a vibratory or shaking device operating on the flow of granular material in the region just upstream of the extrusion mold. Such a device has the function of preventing the building of bridges by particles of the granular mass in the open spaces between the jet nozzles. Very simple forms of devices can be used if the supply tube for the fuel gas and/or the air supply are aligned on the axis of the mold and mounted so as to be axially movable and are connected with a device for applying a shaking or vibrating motion.

The extrusion mold can be flared out towards its downstream end, for example it can be flared conically or pyramidally, preferably at an angle of about 5° to the cone axis. Furthermore, on the inside of the mold longitudinal ribs can be provided aligned with the direction of movement of the rod-shaped body that is produced. The widths and/or the spacing between the ribs is preferably smaller than the average particle diameter of the granular material. The channels thus formed between these longitudinal ribs serve for removal of the spent gas. For the manufacture of rod-shaped bodies with longitudinal grooves, a correspondingly shaped mold can be used. For the production of hollow rod bodies, a mold can be used in which a cooled core of elongated shape oriented parallel to the axis of the mold is provided, held fixed by thin struts.

Cooling means can be provided for the operating walls of the mold. Such an arrangement makes it possible to cool the inner walls of the mold to a temperature below the sticking limit of the granular material. Such cooling excludes any possibility of baking any part of the granular material onto the mold. The cooling means provided for the mold can be gas cooled, for example with cooling air which can thereafter be used as preheated combustion supporting air for the process.

The pulling means for pulling the rigid rod out of the mold preferably contains at least one pair of driven rolls that operate with a specified circumferential velocity and also provide (in the case of flat-sided rods) a slight rolling of the rod body to a desired cross-sectional dimension. The provision of one or more pairs of rolls of that type has the advantage that the frictional forces that arise are relatively small.

The size-processing, pulling and cooling of the rod produced can advantageously be caused to take place in a thermally insulated cooling run provided in a shell connected to the downstream end of the mold and the spent gas issuing from the form can flow in the space between this shell and the finished rod, preferably mixed with some added cooling gas for control of the cooling rate.

The invention is further described by way of illustrative example with reference to the annexed drawings, in which:

FIG. 3 shows the combustion zone of the apparatus of FIG. 2, in a diagrammatic side view and in a detailed representation;

FIG. 4 is a section of the apparatus shown in FIG. 3 on the plane represented by the line IV—IV of FIG. 3;

FIG. 5 is a cross-section of the apparatus shown in FIG. 2 cut along the line V—V of FIG. 2, in an end view;

FIG. 8 is a sectional view, likewise comparable to that of FIG. 2, of still another form of apparatus according to the invention; and FIG. 9 is a partial cross-section of the apparatus shown in FIG. 8 cut along the line IX—IX of FIG. 8.

Figure 1:
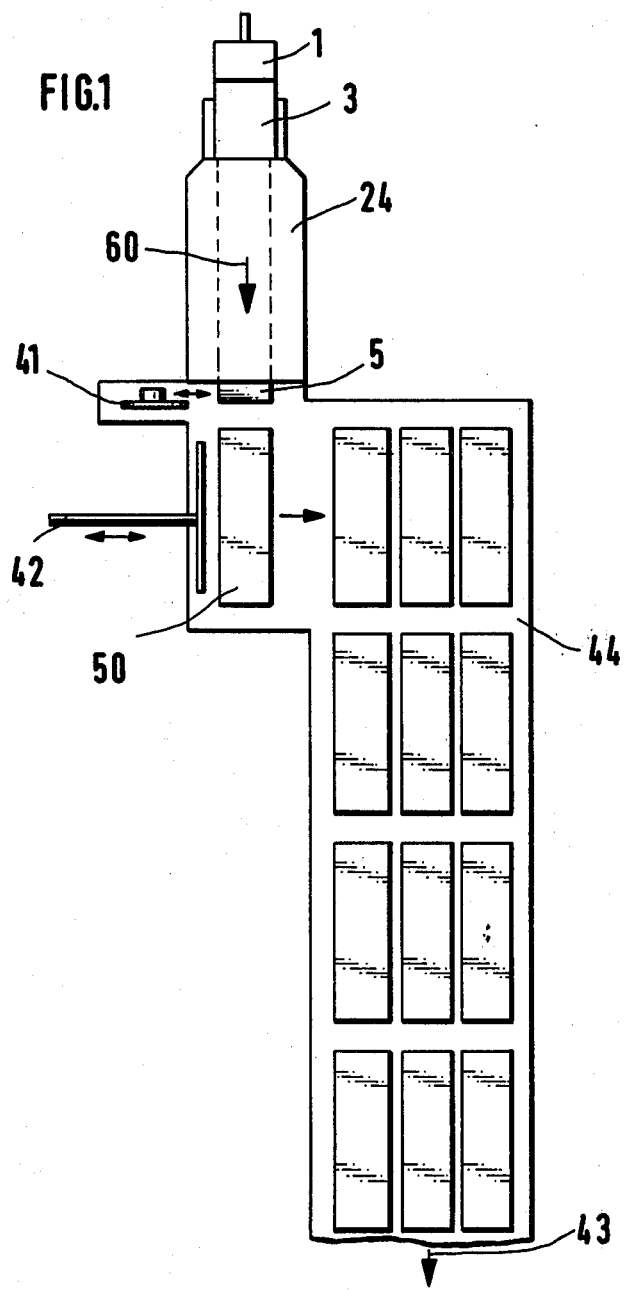
FIG. 1 is a diagrammatic plan view of an apparatus for making rod-shaped units of material of cellular structure from a sinterable granular material, and cutting them into blocks for final cooling, in accordance with the invention.

The apparatus illustrated in FIGS. 1 to 6 includes an entrance portion for the formation of a flow of a mass of granular material, comprising a vertical drop shaft 1 that leads into a horizontal channel 2. The channel 2 leads to a mold 3 which is substantially in the shape of a hollow shell open at both ends and is fixed in position. The mold 3 has a substantially rectangular cross-sectional shape (FIG. 4), since this apparatus is designed to produce a rod of rectangular cross-section in such a way that rectangular blocks, for example of building material, may be continuously produced. On the downstream end of the mold 3 there is connected a unit containing a pulling mechanism 4 by which the molded rod 5 produced in the mold 3 can be continuously pulled out of the mold.

The mold 3 consists of a heat resistant material, for example heat resistant steel. It is built with double walls, the inner walls 6 spreading outward downstream (the downstream direction being indicated by the arrow 60 showing the direction of advance of the solid rod out of the mold). The flaring of the inner walls 6 of the mold may, for example by pyramidal or conical, the surfaces in either case being preferably inclined at about 5° to the mold axis. The cavity between the inside walls 6 of the mold and the outer walls or casings 7 is connected to inlet tubes 8 through which cooling air may be supplied and outlet tubes 9 for discharge of the air that has served to cool the mold. A thermal sensor 10, which may for example be a thermocouple is provided to measure the temperature of the inner mold wall 6.

The mold 3 is provided with a heating means of a rather special character that makes it possible to produce an evenly distributed combustion zone 11 (FIG. 3) extending across the mold cross-section in a configuration that is preferably not planar, but domed or otherwise bulging with its central vertex upstream with respect to the direction of movement of the particles through the mold, for example, a conical, bowed conical (ogival), or parabaloidal shaped shell. A supply tube 12 connected to a supply line 13 supplies a fuel gas to the interior of the mass of granular particles just as they enter or have entered the mold 3. The supply tube 12 leads to a valve system having individual jet nozzles 14 connected to a network of branch tubes which enable the nozzles 14 to deliver the fuel gas at points distributed over a surface conforming to the desired upstream reaction boundary of the combustion zone 11. The jet nozzles 14 are relatively many and closely spaced, connected to the distribution branch tubes 16 with a spacing less than three times the average particle diameter of the granular material fed into the mold. FIG. 5 shows that on account of the elongated cross-section of the mold 3, there are two supply tubes 12 (both of course connected to the line 13).

The vertical descent shaft 1 has a sieve-like wall 18 in its lower portion where it adjoins the horizontal passage 2, so that an air distribution chamber 19 may feed air supplied by a supply line 20 evenly into the mass of granular material across the entire cross-section of the horizontal channel 2. The air thus supplied serves to support the combustion of the fuel gas introduced over the system 12–16. Both the air and the fuel gas are preferably preheated, the air in the preheater 21 and the gas in the preheater 29 and temperature sensors 38 for fuel gas and 39 for the air supply are provided for control of the preheating operation in a known way.

The rod-shaped solid produced in the combustion zone in the cross-sectional dimensions determined by the shape of the mold 3 is continuously pulled out of the mold by a pulling mechanism mounted in the unit 4 mechanically mounted on the downstream side of the mold. The pulling is done by pairs of driving rolls 22 at a definite spacing described further below, these rolls are located in a space 24 enclosed by a thermally insulating case 23 so as to provide an initial cooling or precooling section of the apparatus in which both spent gases from the combustion zone and an admixture of cooling air supplied through the inlet 25 flow in the same direction as the direction 60 in which the rod 5 is pulled. The shaft 1 is filled with a mass of particles of a sinterable granular material having a substantially uniform particle diameter in the range between 1 and 30 mm, preferably in the range between 3 and 20 mm. The sinterable granular material can be one of a considerable variety of ceramic materials (bloating clay, waste glass particles, etc.). The apparatus and process may also be possibly useable with other types of granular materials, for example noncombustible synthetic organic materials on the one hand or metallic granules on the other. Before being introduced into the shaft 1, the granular material may need to be homogenized and, according to the particular properties of the material, it may be desirable to dry it or to moisten it, or even to add selected additive materials to it, as already discussed. For drying and/or heating of the granular material before it reaches the bottom of the shaft 1, a fuel gas can be introduced by the supply pipe 26 and forced into the granular mass, where it will tend to rise countercurrent to the falling granular material.

The granular material 27 goes down the shaft 1 and into the horizontal passage 2 where it is fed by the pneumatic action of the combustion supporting air from the air distribution box 19 in the direction of the arrows 28'. Because of the even distribution of the air over the cross-section of the horizontal passage 2, this pneumatic feed produces an even advance of the granular material that may be described as a piston plug movement or a piston flow in the channel 2, in which the individual particles of the granular material 27 remain at rest with respect to each other and are pushed into the mold 3 in the manner of a homogeneous column. In this movement the granular material passes through the spaces between the gas distribution tubes 16. In order to prevent the formation of bridges by the particles of the granular material between the gas distribution tube 16, the gas supply tube 12 is movably mounted for motion in the axial direction and is coupled to a reciprocating device diagrammatically shown at 28 which may be any of the various well known vibrating and shaking devices. The fuel gas supplied over the line 13 may be propane, for example, or instead it is also possible to use partially burned hydrocarbons or vaporized liquid or solid fuels which are partially burned and/or vaporized in the preheater 29 which puts the fuel in the desired condition and at the same time preheats it, the temperature of the product supplied to the fuel line 13 being controlled with the aid of the temperature sensor 38. The fuel gas issuing out of the jet nozzles 14 mix with the combustion supporting air supplied throughout the mass of moving granular material moving in the direction of the arrows 28', so as to form an ignitable mixture that establishes the combustion zone 11 in the mass 27 of granular material. As mentioned before, the location of the jet nozzles 14 and the distribution of the fuel gas and combustion supporting air, supplied respectively in the direction of the arrows 31 and 30, results in the formation of a combustion zone 11 that bulges in a curved conical fashion upstream with respect to the movement of the granular material 27 and the solid rod 5 that is produced. In the combustion zone 11, the hot combustion gases flow partly in the directions indicated by the arrows 32, thus having a flow direction component directed away from the axis of the mold, which is to say from the interior towards the exterior of the granular mass, so that they can proceed out of the mass being sintered through its edge regions at the flanks of the more or less conical combustion zone 11.

Figure 6:
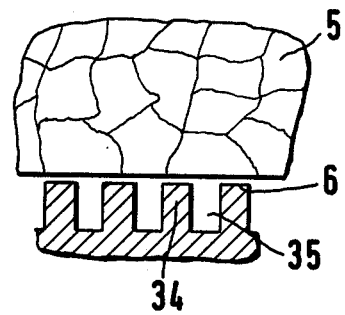
FIG. 6 is a section of the apparatus of FIG. 2 cut along the line VI—VI of FIG. 2 on a larger scale and showing only a detail of a portion of the cross-section.

The mold 3, as shown in FIG. 6, has inner walls 6 that are provided with longitudinal ribs 34 spaced from each other by a distance smaller than the normal particle diameter of the granular material 27, so that the granular particles will not enter into the gas exhaust channels 35 bounded between adjacent ribs 34 and cannot therefore interfere with the outflow of spent gas. The spent gases which in the combustion zone 11 flow towards and into the channel 35 then flow along these channels along the inner walls 6 of the mold 3 to the downstream end of the mold and then proceed into the initial cooling section 24 as shown by the arrows 84 in FIG. 2.

The individual particles of the granular material are brought up to their sintering temperature when they pass through the combustion zone 11 and they are thereby caused to be sintered together and onto the solidly sintered rod body 5 forming just downstream of them, the particles being thus continuously sintered onto to the solid body that is being pulled out of the mold. This process thus forms a cellular structure in the solid rod-shaped body. The mold 3 by its cross-sectional shape determines the circumferential shape of the solid body pulled out by the roll 22, so that the mold 3 may be referred to as an extrusion mold, even though it does not operate under high pressure as common extrusion molds do. The driving rolls 22 (which may be provided not only on the top and bottom surfaces of the rectangular rod of the illustrated example, but also at both sides) may, particularly in the case of a rod with plane sides, be set to reduce slightly the cross-section of the solid rod being pulled, so as to effect a size trimming or "calibration" of the rod produced in the apparatus.

As the same time as the rolls 22 pull and finish the product, the latter is cooled in a controlled manner by cooling air introduced through the inlet 25 and flowing together with the spent gases proceeding in the direction shown by the arrows 84, so that as these spent gases move downstream, they are cooled and in turn progressively cool the rod 5.

EXAMPLE I

An illustrative operation of the method in the apparatus described utilized a bloatable (expandable) granular bloating clay (expandable clay) having a particle diameter of about 15 mm, that was introduced into the shaft 1. By means of heating gas supplied through the pipe 26 and flowing in the shaft 1 in countercurrent to the granular material, the latter was heated to about 900° C. The combustion supporting air was likewise heated to the same preheating temperature of about 900° C. in the air preheater 21 and supplied through the air distribution box 19 to flow along with the granular mass, which was as above described pneumatically advanced down the horizontal passage 2 by the force of the air supply. Liquid fuel composed of hydrocarbons was partially burned in the device 29, causing the hydrocarbons to be converted into CO and $H_2$, which has the advantage that with this type of gaseous fuel supplied by the line 13, there is no soot deposit in the piping and nozzle system 14,16 to interfere with the continued use of the process. Heat liberated by the partial combustion was used to bring the fuel gas so produced up to a temperature of 900° C. for delivery by the jet nozzles 14, so that as it issued from these jet nozzles it was ignited within the mass of the hot granular material. In the generally conically-shaped combustion zone 11, the sintering temperature of the material, which is about 1150° C. was established and the process operated to maintain this temperature. The inner walls 6 of the mold 3 were cooled to about 1000° C. by air supplied and removed respectively through the piping 8 and 9, thus preventing any of the granular material from being baked onto the mold.

Figure 2:
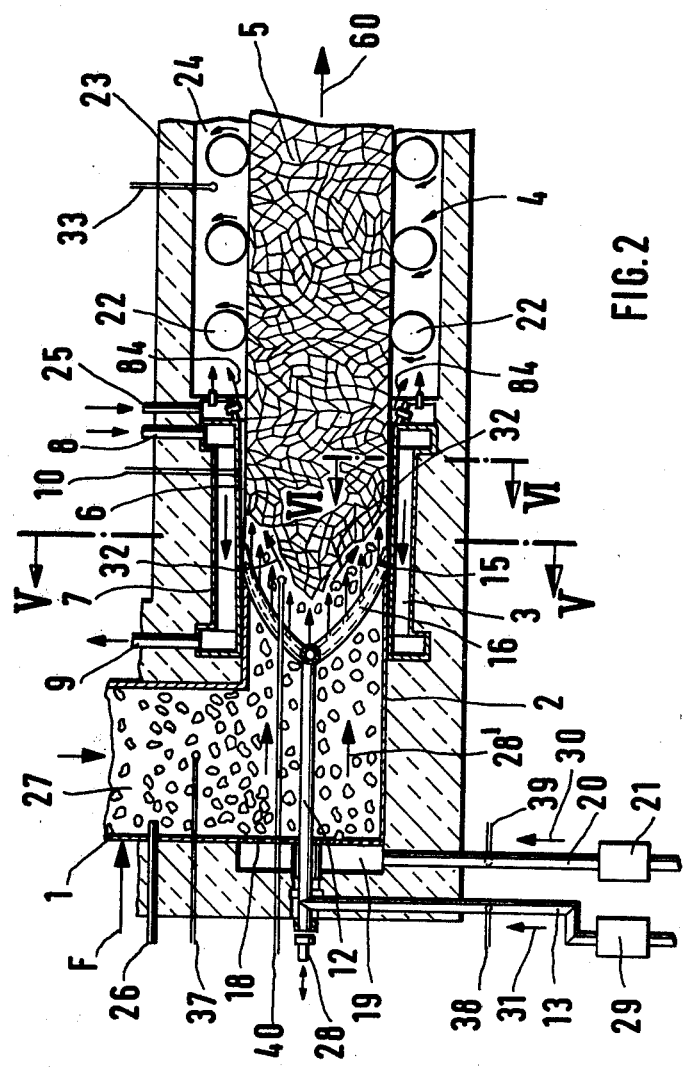
FIG. 2 is a side elevation, in axial cross-section, of a portion of the apparatus of FIG. 1 selected to show the combustion zone and the pulling means in a diagrammatic representation.

The rate of advance of the solid rod, which normally is in the range between 0.1 to 1 meter per minute, was in this case 0.2 m/min. In the initial cooling section the continually formed rod-shaped body 5 was cooled down to 700° C. as determined by the thermal sensor 35 (FIG. 2).

The preheating temperature in the shaft 1 and also the preheat temperatures of the fuel gas in the supply line 13 and that of the air supply in the supply line 20 were monitored by thermal sensors 37, 38 and 39.

For control of the temperature in the combustion zone 11, the combustion temperature is continuously determined by means of a sensor in the form of a thermocouple 40. This thermocouple is provided with a suitable protective shell, for example one made of an oxide sintered at high temperature, in order to protect the sensor against baking on of the granular material. For further avoidance of interference by adhesion of the process material, the thermocouple 40 can be intermittently inserted into the combustion zone 11 for short periods after each of which it is promptly withdrawn.

With constant rod advance and constant preheat temperature of the granular material (measured at 37), of the fuel gas (at 38) and of the air supply (at 39), the combustion temperature (measured at 40) is adjusted by the energy supply, while the rate of supply of the mass of granular material can be adjusted by the level of filling F in the shaft 1.

For economic rod-advance velocities for a rod-shaped body 5 made of clay, for example, very long cooling stretches are necessary on account of the slow cooling that is necessary through the conversion temperature between 600° C. and 500° C. It is therefore important to subdivide the rod-shaped body after the pre-cooling provided in the cooling section 24 into blocks 50 and thereafter to convey them in multiple groups arrayed side by side and/or stacked one above the other through a slow cooling section. Apparatus with such provisions is diagrammatically shown in FIG. 1.

The rod-shaped body 5, pulled continuously out of the mold 3 in the direction of the arrow 60, as shown in FIG. 1, first passes through the initial cooling section 24 already described, in which it is cooled relatively fast to a temperature value that in the case of fire clay has a value of about 700° C. and is so chosen that the formation of cracks in the solid body is still precluded. Following the cooling section 24 which has been described as a fast cooling section, a subdividing device 41 operates, which is arranged to cut the rod 5, as it moves, into rough blocks 50. These blocks 50 are then stacked in side-by-side groups of three, in the illustrated case, by a stacking device 42 and then moved in successive rows in the direction of the arrow 43 through a slow cooling section 44 which is constructed in the form of a conveyor oven, although it could also be constituted as a batch oven that is filled with a layer of product and then cooled in a controlled fashion. The heating of the slow cooling section 44 to prevent an excessive cooling rate is performed with waste gas that comes out of the mold 3 as indicated by the arrows 84. The waste heat remaining in the gases coming out of the slow cooling section 44 can be used as waste process heat for preheating the raw granulated material, the air supply or the fuel gas supply.

After coming out of the slow cooling section 44, the blocks 50 are cooled by air to room temperature and, if necessary, finished to final dimensions in some suitable way. The finished product, for example, could be provided with protective metal strips embedded in grooves to serve as reenforcement.

Within the concept of the device of FIG. 1, it is also possible to subject the rod-shaped solid body 5, upon its exit from the initial cooling zone 24, or the subdivided raw blocks 50, to an after-treatment, which for example can consist of glazing the surface or, more generally, providing a layer of different properties on the surface of the solid. Furthermore, the outer zones of the rod body 5 can be post-fired, if necessary or desirable, with a plurality of individual surface firing burners not shown in the drawing.

Figure 7:
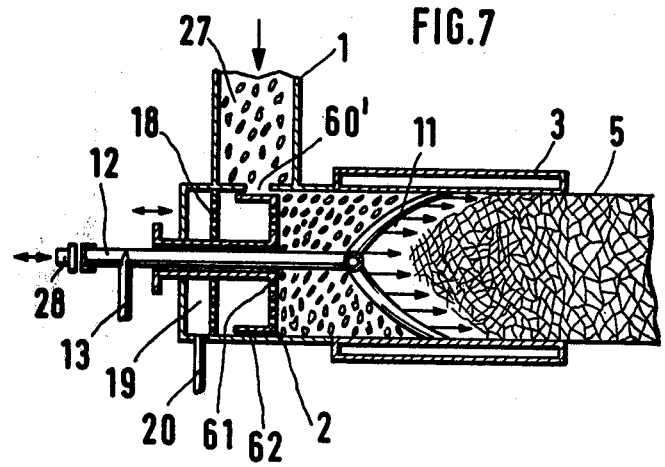
FIG. 7 is a longitudinal section view of another form of the apparatus according to the invention in a sectional view comparable to that shown in FIG. 2.

Whereas the embodiment of the invention illustrated in FIGS. 2 to 5 and the process involved in its operation utilize movement of the mass of granular material 27 into the combustion zone 11 by pneumatic means provided by the combustion supporting air supplied through the air distribution box 19 and the sieve wall 18, it is also possible to operate the process and equipment with a mechanical means for advancing the mass of granular material. Such a mechanical drive for the flow of granular material in the passage 2 can be either continuous, for example by means of a conveyor screw or the like (not shown in the drawings) or intermittent and periodic. An illustrated embodiment of the latter case is shown in FIG. 7. FIG. 7 corresponds to FIG. 2 in many respects and corresponding parts are for that reason designated with the same reference numeral.

The free fall shaft is in this case closed below by the cover wall of the horizontal passage 2 in which an intake opening 60' is provided. In the passage 2 a transverse pusher member 61 which is permeable to air, extends completely across the cross-section of the passage 2 and is movable back and forth along the length of the passage 2, is provided for movement back and forth by a reciprocating driving device not shown in the drawing. In FIG. 7 the farthest advanced position of the pusher member 61 is illustrated. For air permeability, the pusher may be provided with multiple perforations or it may be made of stiff wire screening.

When the pusher member 61 is drawn back from the position shown in FIG. 7 to its rearmost position, the opening 60' is uncovered by the skirts 62 of the pusher and granular material falls out of the shaft 1 into the passage 2 until the latter is filled. The next forward movement of the pusher member 61 advances the newly filled granular material along the passage 2 to the combustion zone 11, while at the same time the skirt flange 62 of the pusher 61 closes the opening 60'. By suitable setting of the frequency of the back-and-forth movement of the pusher member 61 with respect to the grain size of the particles of the granular material 27 as well as the dimensions of the passage 2 and of the free fall shaft 1, it is possible to obtain a trouble-free advance of the granular material in the passage 2 with respect to the operation of the continuous sintering process. If desired, however, it is possible to vary the feed of air and fuel in synchronism by means of intermittently variable operating blowers inserted in the lines 13 and 20, so that somewhat more heat is supplied as material is advanced into the combustion zone and somewhat less during the retraction of the pusher member 61. In the arrangement of FIG. 7, it is possible to dispense with the vibrator device 28', which is also shown in FIG. 7, at least for some kinds of granular materials with regard to which the intermittent motion of the granular mass provided by the pusher member 61 may be sufficient to avoid the formation of bridges obstructing passage through the heating device.

Whereas in the apparatus shown in FIG. 2 the advance of the solid rod body 5 is provided by the pulling device 4 in which the drive roll pairs 22 operate, it is also possible to provide other embodiments in which the advance of the solid body 5 is differently provided for. Thus in the case of a gas-impermeable mold rod, as is present normally when the material is fire-clay, the advance of the solid rod 5 could also be provided by producing a gas overpressure in the mold 3 and the combustion gases themselves can be used to produce this pressure.

As a rule it is desirable to orient horizontally the passage 2 which leads the moving mass of granular material into the mold 3, as shown in FIGS. 2 and 7. Other kinds of embodiments for the practice of the invention are also possible, in which the passage 2 is vertical, and in such cases the conditions of operation may be such that a separate free fall shaft 1 is superfluous.

In the embodiment shown in FIGS. 8 and 9, the passage 2a leading the moving mass of granular material into the mold 3 is inclined to be horizontal and runs obliquely, whereas the drop shaft 1 is vertical as in the other embodiments. On top of the drop shaft 1, a silo or other supply container 61' is mounted into which the granular material 27 can be brought through a loading opening 62'. In the supply container 61', the gas inlet 26a is in this case provided as a double tube for blowing both fuel and air into the container 61', where they ignite. The hot combustion gases flow through the sieve type floor 63 for the container 61' and then through the granular material heaped thereon, and exit through the raw material inlet 62' after preheating the granular material. A lock 64 is provided in the connection region between the supply container 61' and the drop shaft 1, having two lock gates 65 and 66 spaced apart to provide the intervening pressure lock and separately operable by means of operating controls 67 and 68. By manipulating the controls 67 and 68, the preheated granular material can be subdivided into definite quantities that are introduced one by one into the drop shaft 1 without appreciably releasing the over-atmospheric pressure that is present in the fall shaft 1 below the lock 64. As an upward extension of the inclined passage 2a, which is itself an extension of the passage through the mold 3, there is provided a coaxial combustion chamber 29a into which a fuel is provided through a pipe 13 and primary air is provided through a conduit 20 coaxial with the pipe 13 where the latter enters the combustion chamber. The mixture of primary air and fuel produces partial combustion of the fuel as the result of which the hydrocarbons of the fuel are decomposed into $H_2$ and CO (with corresponding admixtures of $N_2$, $H_2O$ and $CO_2$) at a temperature of about 1200° C. The passage 2a connecting the combustion chamber 29a with the mold 3 is provided with an array of jet nozzles 14a running parallel and adjacent to each other each having one end in the combustion chamber 29a and the other at the jet nozzle surface 15 forming a boundary of the combustion zone 11. The jet nozzles 14a are in each case surrounded by an outer tube 14b (not visible in FIG. 8, but shown in FIG. 9) so as to form coaxial double tube combinations with the nozzle 14a on the inside in each case. The outer tubes 14b are supplied with secondary air through a supply pipe 70. The outer tubes 14b are connected with support webs 71 (FIG. 9) that have so small a cross-section that they do not substantially interfere with the advance of the granular material into the passage 2a and thence into the mold 3. The partially burned fuel furnished to the combustion zone 11 through the jet nozzles 14a is fully burned in the combustion zone 11 with the secondary air supplied through the outer tubes 14b. The partial combustion of the fuel produced in the combustion chamber 29a prevents or mitigates the deposit of soot in the jet nozzles 14a.

The manner of operation of the apparatus of FIGS. 8 and 9 corresponds to that of the previously described embodiments. Parts of the apparatus here shown that correspond to parts previously explained are designated with the same reference numerals, so that a further explanation regarding these parts is unnecessary. The rod-shaped body 5 coming out of the mold 3 is bent while still soft into a horizontal position, with the pulling roll 22 also taking on the function of bending and guiding rolls. After the rod-shaped body reaches the horizontal position, it is cooled in the manner previously described and, to the extent desired, subdivided by cutting.

In order to provide that during operation of the apparatus and process stable relations are maintained in the combustion zone even when no solid body 5 has yet been formed, it is practical at first to close the end of the mold 3 by a stopper (not shown) that is removed as soon as the formation of the rod-shaped body takes place and said body begins to move out of the mold 3.

Still other kinds of embodiments for the practice of the invention are possible within the inventive concept in which the granular material contains either combustible additive materials or receives additions of such materials, in which case these materials are ignited and burned in the combustion zone 11 by means of the combustion supporting air. The combustion product gases produced by this combustion pass through the moving mass of granular material from the inside outwards in order to flow away thereafter in the region of the mold inner walls 6, passing in the spaces 35 between the ridges 34 and going out of the mold as shown by the arrows 84 of FIG. 2. In this embodiment just mentioned, it is possible to dispense with the nozzle tubes 14.

It may also be observed that, in principle, it is also possible to interchange the arrangements shown in FIGS. 2 and 7 for supplying combustion supporting air and fuel gas respectively with each other.

I claim:

1. A process for producing rod-shaped bodies of cellular structure from a sinterable granular ceramic material by passing said granular material through a mold while supplying heat thereto evenly to bring said granular material to a sintering temperature before it leaves the mold, comprising substantially concurrent performance of the steps of:

causing a mass of particles of said granular material to move in an even flow through a fixed tubular extrusion mold defining the cross-section of a desired rod-shaped body to be formed;

uniformly heating said mass of particles to the sintering temperature of the material within said mold by causing said mass to pass through a combustion zone within said extrusion mold, and which zone is defined by combustion of a fuel within the aggregation of granular material where the granular material is being compacted, said fuel being fed through said granular material in the average direction corresponding to the direction of the movement of said granular material pulling endwise out of said extrusion mold a body of cellular sintered-together material formed by said granular material in said combustion zone, the granular material being continuously sintered onto the end of said body as it is correspondingly pulled out of said form.

2. A process as defined in claim 1, in which said mass of particles of granulated material is prewarmed to a temperature below the sintering temperature of the material prior to the entry of said mass of particles of granular material into said extrusion mold.

3. A process as defined in claim 1, in which said particles of granular material are caused to flow in a mass through said extrusion mold with substantially no movement of said particles relative to each other, in the manner of a piston body displacement movement, through said combustion zone.

4. A process as defined in claim 1, in which the heating to sintering temperature is performed by gas combustion in said combustion zone and in which one gas which participates in combustion in said combustion zone is caused to flow in a stream in step with the flow of said mass of particles of granular material into said extrusion mold.

5. A process as defined in claim 4, in which said heating step is carried out by causing gases participating in combustion in said combustion zone to flow within said extrusion mold with components of motion transverse to the direction of granule flow which are directed from the inside of said mass towards the periphery thereof.

6. A process as defined in claim 1, in which the heating to sintering temperature is performed at least in part by gas combustion within the aggregation of granular material in said combustion zone.

7. A process as defined in claim 6, in which combustible additive materials are added to said mass of particles of granular material before said particles are caused to flow from said accumulation to said extrusion mold.

8. A process as defined in claim 5, in which said gases are brought together in an upstreamwardly domed zone of bowed conical configuration coaxial with the direction of movement of said mass of particles through said extrusion mold in order to produce therein a combustion zone for heating said mass of particles to their sintering temperature, whereby the gases in moving downstream from their place of meeting are caused to have a component of motion directed from the inside of said mass toward the periphery thereof.

9. A process as defined in claim 4, in which a gaseous fuel and combustion-supporting air are separately supplied and are mixed in a region on the upstream boundary of said combustion zone, as well as uniformly distributed over the cross-section of said flowing mass of granulated particles, and ignited as they pass into said combustion zone.

10. A process as defined in claim 9, in which one of the gases participating in combustion, the fuel or the combustion supporting air, is brought to the combustion zone with the flow of said particles and the other of said gases is released at the edge of said combustion zone through a multiplicity of jets distributed evenly with respect to the cross-section of said extrusion mold.

11. A process as defined in claim 10, in which the spacing between individual jets of said jets is smaller than three times the average diameter of said particles of granular material.

12. A process as defined in claim 9, in which said combustion supporting air is preheated before being introduced into said mass of particles.

13. A process as defined in claim 12, in which said gaseous fuel is produced by partial combustion of solid, fluid or gaseous fuel materials and thereby put into preheated gaseous condition.

14. A process as defined in claim 13, in which conditions in said combustion zone are regulated by controlling the fuel to air ratio of the gases participating in combustion.

15. A process as defined in claim 4, in which said mass of particles of granular material is caused to flow through said extrusion mold by being propelled pneumatically therethrough.

16. A process as defined in claim 1, in which the flow of said mass of particles of granulated material through said extrusion mold is caused at least in part by pushing said mass mechanically intermittently towards said extrusion mold.

17. A process as defined in claim 4, in which the advancing movement of said rod-shaped body is produced at least in part by a overpressure of gas occurring within said extrusion mold.

18. A process as defined in claim 1, which includes the step of cooling the walls of said extrusion mold for reducing the sticking of particles thereto.

19. A process as defined in claim 17, in which said cooling of said extrusion mold retains said extrusion mold at a temperature substantially below the lowest temperature at which said particles or said rod-shaped body tends to adhere to said extrusion mold.

20. A process as defined in claim 1, in which after said body comes out of said extrusion mold, it is trimmed in a die.

21. A process as defined in claim 20, in which after issuing from said extrusion mold, said rod-shaped body is subdivided.

22. A process as defined in claim 1, in which said mass of particles is capable of being bloated and in which said particles are bloated in said combustion zone at the same time as they are sintered together to produce a rod-shaped body.

23. A process as defined in claim 20, in which said particles are of a material capable of being pre-bloated, and in which said particles are bloated by heating prior to their introduction into said extrusion mold and are brought into said combustion zone in said extrusion mold without substantial cooling between their pre-bloating and their reaching said combustion zone.

24. A process as defined in claim 20, in which the rod-shaped body, after it leaves said extrusion mold, is cooled under control of the cooling rate performed by control of gas surrounding said body.

25. A process as defined in claim 24, in which the cooling rate of said body after it issues from said extrusion mold is controlled by the use of waste gases also issuing from said extrusion mold for reducing the cooling rate.

26. A process as defined in claim 1, in which said mass of particles is prewarmed immediately before its entry into said extrusion mold by hot heating gases that are caused to flow in a counter-current direction relative to the flow of said mass of particles.

27. A process as defined in claim 1, in which the surface of said rod-shaped body is subjected to firing after its exit from said extrusion mold.

28. A process as defined in claim 1, in which the surface of said rod-shaped body is provided with a coating of material after its exit from said extrusion mold.

29. A process as defined in claim 1, in which the temperature in the combustion zone is measured from time to time during the operation of the process.

* * * * *